Fig. - I

INVENTOR
TRYGVE RINGEREIDE
BY Curphey + Erickson
PATENT AGENTS

INVENTOR
TRYGVE RINGEREIDE
BY *Carphey & Erickson*
PATENT AGENTS

United States Patent Office 3,402,340
Patented Sept. 17, 1968

3,402,340

FREQUENCY MULTIPLIER AND A PLURALITY OF TUNING STUBS TO ACHIEVE ISOLATION

Trygve Ringereide, Ottawa, Ontario, Canada, assignor to Northern Electric Company Limited, Montreal, Quebec, Canada Filed Sept. 20, 1966, Ser. No. 580,770
6 Claims. (Cl. 321—69)

ABSTRACT OF THE DISCLOSURE

A microwave frequency multiplier using a varactor diode located at one end of a transmission line and fed from the other end. The multiplier includes a number of idler circuits, each of which has a first tuning stub for series resonating the varactor at one of the idler frequencies and a second tuning stub which reflects parallel resonance at the junction of the said one stub and the transmission line, so as to prevent interaction between a lower frequency idler circuit and the higher frequency ones.

This invention relates to a frequency multiplier which utilizes a varactor as the active element, and more particularly to a high-order frequency multiplier constructed of distributed constants.

Frequency multipliers utilizing varactors (variable capacitance diodes) as the active elements as well known. An extensive treatment on the subject has been given by Penfield and Rafuse in the text entitled "Varactor Applications"; The MIT Press 1962, chapter 8, which provides a theoretical analysis of frequency multipliers from doublers to octuplers.

Varactors having either abrupt-junctions or graded-junctions may be used for such applications, although the former type appears to be preferred. The simplest form of harmonic or frequency multipler using an abrupt-junction varactor is the doubler which can operate without current flow at idler freqeuncies since the voltage across such a varactor is proportional to the square of the charge on it. This results in an A-C voltage which is generated at the second harmonic of the input frequency. An idler signal is one which is necessary to the operation of a frequency multiplier but which does not form part of the input or output signals. In general idler frequencies are intermediate the input and output signal frequencies. For all other higher-order multipliers, idler currents are essential if any output is to be obtained. While this is not strictly true for graded-junction varactors, the efficiency of such multipliers without idlers is unnecessarily small.

When multipliers are constructed of lumped constants, a plurality of components can be coupled in series or in parallel to tune or isolate the various input, output and idler frequency signals from each other. However, when the same technique is applied to distributed constants, the problem of isolating the various tuned circuits is compounded by the fact that open and short-circuited resonant stubs are not only resonant at a fundamental frequency but at all odd harmonics of that frequency. Conversely, each of the stubs is anti-resonant at all even order harmonics of the fundamental frequency. Off resonance, the tuning stubs reflect a variety of impedances at the various harmonically related frequencies, depending upon their electrical length at the particular frequency of interest. Hence, unless some form of isolation can be achieved between the tuning elements at the various frequencies involved, interaction between these elements will be such that a practical high-order frequency multiplier cannot be constructed.

The above-mentioned text illustrates the mechanical synthesis of a frequency multiplier in distributed constants for a doubler only. In "Electronics" Oct. 11, 1963, the design of a quadrupler in distributed constants is described in an article entitled "How to Design Solid-State Microwave Generators" by D. O. Fairley, pages 23–28. In both the text and the article where the harmonic multiplier is constructed of distributed constants, the varactor is connected in series with the centre conductor of the transmission line between the input and output circuit, and tuning stubs are employed to isolate the input and output from each other as well as to tune the idler frequency (in the case of the quadrupler). While this type of construction is satisfactory for low-order multipliers, when the same technique is applied to high-order multipliers, such as a 16 times multiplier, discontinuities in the stubs affect the higher frequencies to a greater degree than the lower frequencies so that a single stub cannot be used to provide a tuned circuit at a plurality of harmonic frequencies. If a number of stubs are connected in parallel with each other, without isolation between them, the tuning of one will directly affect the tuning of the other so that it is virtually impossible to construct a practical model.

One solution to this problem is to build a series of low-order multipliers such as doublers or quadruplers and then cascade them to achieve higher-order multiplication. However, one of the difficulties in cascading a number of low-order multipliers is that the chances of generating spurious oscillations is increased. In addition, the cost of the overall unit will be greater since at least two varactors will be required together with associated matching circuits at the input and output of each multiplier.

Applicant has discovered that by placing the varactor at one end of a transmission line which is driven from the other end, and providing along the line at predetermined points a plurality of stubs to series tune the varactor at each of the idler frequencies, and parallel tune the transmission line so as to prevent interaction between the tuning of the lower harmonics and the higher ones, a practical circuit can be constructed which can provide at least 16 times multiplication in a single multiplier.

In accordance with the present invention there is provided a frequency multiplier comprising a transmission line having an input coupling circuit connected at one end and a varactor connected at the other end. An output coupling circuit is connected to the transmission line, adjacent the varactor. Located between the output coupling circuit and the input coupling circuit is a tuning stub which provides parallel resonance at the output signal frequency and thereby prevents output signals from passing back down the transmission line to the input coupling circuit. In addition, the multiplier comprises an idler circuit at each idler frequency, each circuit having a pair of tuning stubs which provide series resonance with the varactor, and parallel resonance on the transmission line so as to prevent transmission of the respective idler signal back down the transmission line towards the input end.

In a preferred form of the invention, the multiplier also comprises a tuning stub located between the output coupling circuit and the varactor which reflects an open circuit to the aractor at the second harmonic of the output signal frequency. This prevents unwanted currents at the second harmonic of the output signal frequency from circulating through the varactor and thereby improves the efficiency of the multiplier. Preferably, the output circuit is matched to a load so as to provide maximum power transfer of the output signal.

In one embodiment of the invention, the multiplier is constructed in strip line and the individual output and idler circuits are tuned by utilizing a plurality of small tuning screws located at maximum voltage points on open ended tuning stubs. Since the output signal and each of the idler signals generated in the varactor are prevented from travelling back down the transmission line beyond a predetermined point, tuning of the multiplier can be achieved by tuning first the output circuit and then the higher harmonics progressing down through the lower harmonics to the fundamental input frequency with substantially no interaction between the lower idler signal tuning elements and those of the higher idler signals.

To prevent unwanted signals from appearing at the output of the multiplier, a preferred embodiment includes a bandpass filter tuned to the output signal frequency. The filter is located a predetermined distance from the output coupling circuit so as to reflect substantially an open circuit at the idler signal frequencies.

An example embodiment of the invention will now be described with reference to the accompanying drawings in which.

In the embodiment of the invention described below, the frequency multiplier was constructed of the strip line. In the plan view of FIGURE 1, the centre conductor is shown as being mounted on the lower half of the unit while the upper half has been removed for clarity. It will be understood that in a complete unit, the multiplier comprises a flat centre-conductor sandwiched between flat ground-planes and insulated therefrom by a dielectric medium. Energy is transmitted in the transverse electromagnetic (TEM) mode.

The characteristic impedance of the strip line in the example embodiment is 50 ohms. This impedance was chosen to give optimum Q for the particular type of dielectric medium used. As discussed in detail in the above-mentioned text by Penfield and Rafuse, any frequency multiplier greater than 2 requires one or more idlers. The present embodiment is of the 1–2–4–8–16 type and was designed to operate with an input signal frequency $\omega_0$ of 250 mHz. and an output signal frequency $16\omega_0$ of 4 gHz.

*General description*

Figure 1:
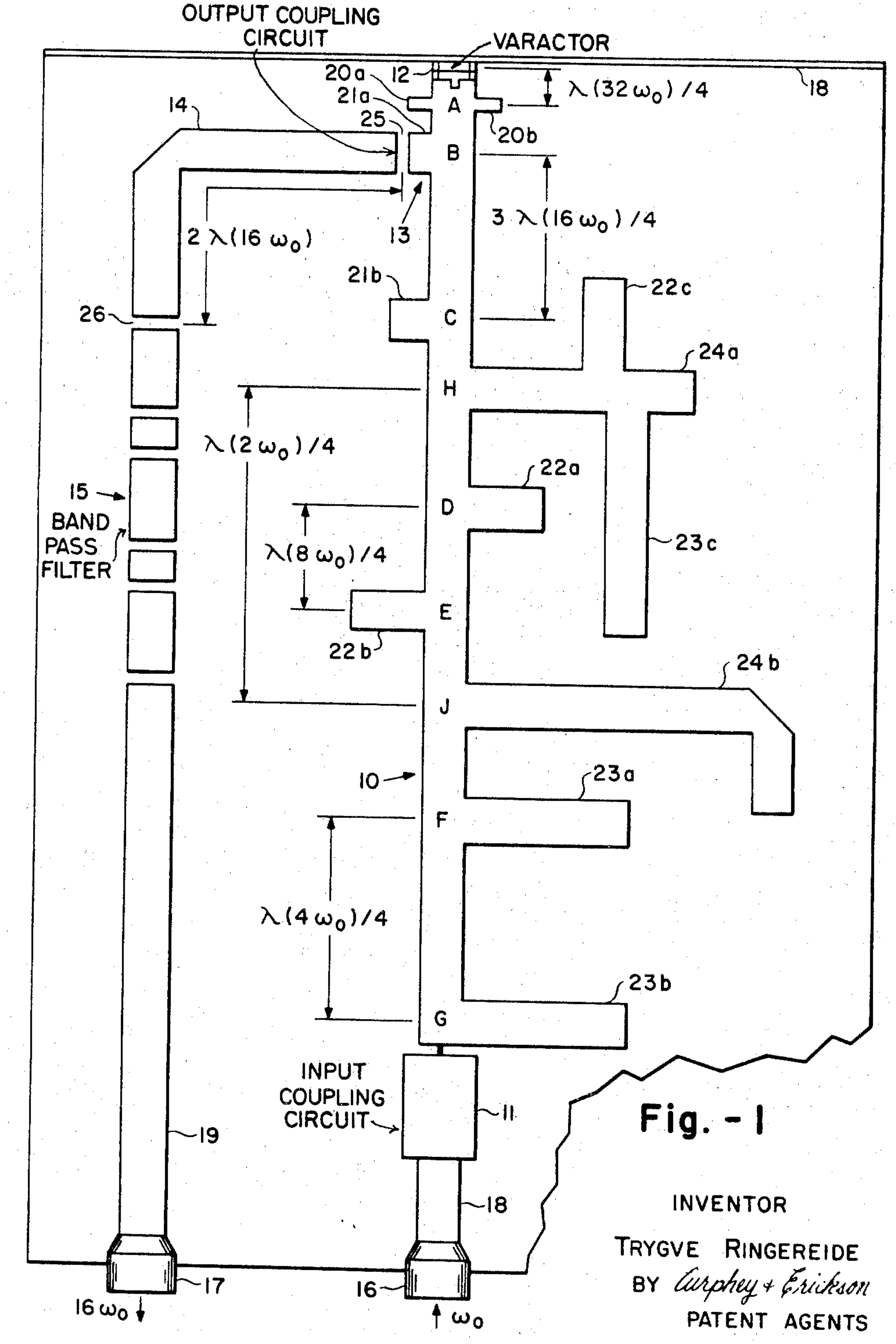
FIGURE 1 illustrates a plan view of a sixteen times frequency multiplier in accordance with the present invention.

Referring to FIGURE 1, the frequency multiplier comprises a transmission line, generally 10, having an input coupling circuit 11 connected at one end, and a varactor 12 connected at the other end. Coupled to the transmission line 10 is an output coupling circuit, generally 13, which is coupled through a further transmission line 14 to a bandpass filter, generally 15. Both the input to the input coupling circuit 11 and the output of the bandpass filter 15 are connected to coaxial connectors 16 and 17 by transmission lines 18 and 19 respectively.

The varactor 12, which is connected at one end to the transmission line 10, is connected at the other end to a shorting bar 18, which in turn is connected to the two ground planes (not shown) forming the top and bottom of the strip line assembly. It is essential that complete symmetry be maintained between the varactor 12 and the two ground planes otherwise modes other than the desired TEM mode may be generated on the line 10. Alternatively, a matched pair of varactors could be mounted between the end of the transmission line 10 and the two ground planes thereby eliminating the use of the shorting bar 18.

The varactor 12 is matched to a load, resonated at the idler frequencies and open-circuited at the second harmonic of the output frequency by a plurality of tuning stubs connected to the transmission line 10. The following table sets forth the various open-ended tuning stubs connected to the transmission line 10 and indicates their electrical length relative to the input signal frequency $\omega_0$.

| Tuning stub Nos.: | Electrical length |
|---|---|
| **20***a*, **20***b* | $\lambda(32\omega_0)/4$ |
| **21***b* | $\lambda(16\omega_0)/4$ |
| **22***a*, **22***b*, **22***c* | $\lambda(8\omega_0)/4$ |
| **23***a*, **23***b*, **23***c* | $\lambda(4\omega_0)/4$ |
| **24***a*, **24***b* | $\lambda(2\omega_0)/4$ |

For convenience, stubs used for tuning the same signal frequency are identified by the same number. To distinguish between them, each number is followed by a letter. In the following description, only the number will be referred to except where it is desired to distinguish between the stubs.

The capacitance of the varactor 12 varies with the bias across it. This bias may be produced by an external bias, self bias or a combination of both. In attempting to match the varactor 12 to a load at the input or output frequencies, or to a tuned load at an idler frequency, an average value of capacitance is assumed. The (average) reactance of the varactor 12 at a frequency $\omega$ is then:

$$X_\omega=\frac{1}{j\omega(C_v+C_s)}+j\omega L_s$$

where:

$X_\omega$=the reactance of the varactor 12 at a frequency $\omega$ $C_v$=the capacitance of the junction with a bias v. (volts) across it (normally obtained from the manufacturer's curves of capacitance vs. voltage)

$C_s$=capacitance of the case of the varactor 12

$L_s$=inductance of the electrodes of the varactor 12

Likewise, the (average) impedance of the varactor 12 at a frequency $\omega$ is:

$$Z_\omega=R_\omega+X_\omega$$

where:

$Z_\omega$=the impedance of the varactor 12 at a frequency $R_\omega=AR_s$ $R_s$=the series resistance of the varactor 12

$A$=a multiplier factor which: (1) varies with the multiplier input frequency, (2) varies with the cut off frequency of the varactor, (3) varies with the order of multiplication, and (4) will be different at the input and output frequencies of the multiplier. Values of the input resistance and the output resistance can be calculated or may be obtained from published tables such as those given in the above-mentioned text by Penfield and Rafuse.

$X_\omega$=the reactance of the varactor 12 at a frequency $\omega$

*Harmonic suppression*

For greatest efficiency, the varactor 12 should be open-circuited at least at the second harmonic of the output frequency $32\omega_0$. To accomplish this, open circuited stubs 20 having an electrical length $\lambda(32\omega_0)/4$ are connected to the transmission line 10 at reference point A. The junction A is in turn located $\lambda(32\omega_0)/4$ from the junction of the varactor 12. The open-circuited stubs 20 each reflect a short circuit at reference point A which in turn reflects an open-circuit at the junction of the varactor 12 at $32\omega_0$. In the present embodiment, each of the stubs 20 have a characteristic impedance of 100 ohms. The two stubs placed in parallel across the transmission line 10 act as a single stub having a characteristic impedance of 50 ohms. The reason for this is that it is difficult to obtain an effective short-circuit on the transmission line 10 utilizing $\lambda/4$ stubs which are wide in comparison to their length.

*Output coupling circuit*

For optimum performance, the varactor 12 must be matched to the transmission line 14 by the output coupling circuit 13. In addition, power at the output signal frequency must be prevented from travelling back down the transmission line 10 towards the input coupling circuit 11. Since the stubs 20 to 24 are connected in parallel with the transmission line 10, all calculations for determining the relative position of the stubs will be done in terms of admittances.

The impedance of the varactor 12 at the output frequency is first determined as previously described. This value is then converted to an output admittance. In the present case, the normalized admittance will have a typical of $Y=G_{16\omega_0}-j\beta_{16\omega_0}$. In order for the varactor 12 to be properly matched to a load, the input admittance presented across the terminals of the varactor 12 must be the conjugate of the varactor admittance, i.e., $$Y=G_{16\omega_0}+j\beta_{16\omega_0}$$

Figures 3, 4:
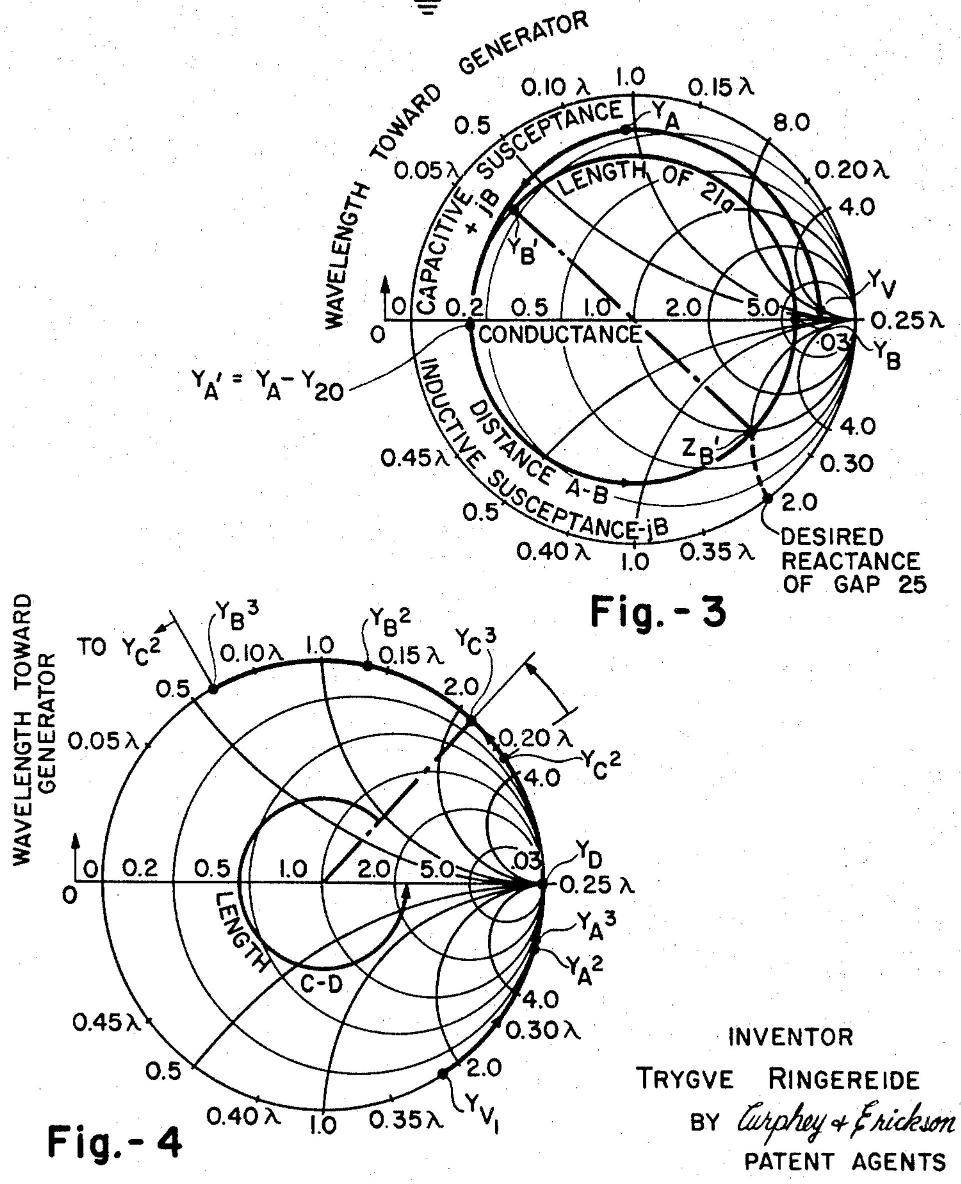
FIGURE 3 is a Smith Chart representation of the admittance calculations of the output coupling circuit forming part of the invention illustrated in FIGURE 1; and, FIGURE 4 is a Smith Chart representation of the admittance calculations of one of the idler circuits forming part of the invention illustrated in FIGURE 1.

In FIGURE 3, this conjugate admittance at the output frequency is plotted on the Smith Chart as $Y_V$. The admittance is then transformed to junction A by moving counter-clockwise around the Smith Chart a distance equal to the electrical length of that portion of the transmission line 10 between the varactor 12 and the reference point A at the output frequency $16\omega_0$.

Since by design the reference point A is $\lambda(32\omega_0)/4$ from the varactor 12, this converts to $\lambda(16\omega_0)/8$ at the output frequency. The movement around the Smith Chart is in a counter-clockwise direction since by convention this is assumed to be away from the generator which in the present case is the varactor 12 at the output frequency $16\omega_0$. The desired admittance is now designated $Y_A$. Since this is the desired reflected admittance, in order that the varactor 12 will be properly matched to the transmission line 14, the admittance of the stubs 20 must be subtracted from that shown at $Y_A$. The electrical length of the stubs 20 at the output frequency is equal to $\lambda(16\omega_0)/8$ and hence the stubs reflect an admittance of $Y_{20}=+j1.0$. When this is subtracted from $Y_A$ the desired admittance is transferred to point $Y_{A^1}$ on FIGURE 3. Thus, $$Y_A-Y_{20}=Y_{A^1}$$

The admittance is then transformed to a high admittance point which is designated $Y_B$. This admittance is the desired admittance at the reference point B on the transmission line 10. At this point on the transmission line 10, there is placed an output stub **21*a* forming part of the output coupling circuit 13. The admittance at $Y_B$ on the Smith Chart is then transformed along the length of the stub 21*a* to a desired point where there is located a discontinuity, in the present case, a gap 25. This transforms the admittance to the characteristic admittance of the line 14. Since the gap 25 is in series with the output coupling circuit, the position of the gap 25 which determines the length of the stub 21*a*, can best be determined by plotting the required impedance at the outer end of the stub 21*a*. In order to transform an admittance to an impedance, the diametrically opposite point on the Smith Chart is chosen so that the radii from the centre are equal. Therefore, if the admittance at $Y_B$ is transformed around the Smith Chart to the point $Y_{B^1}$ so that the corresponding impedance $E_{B^1}$ falls on the $R=1$ circle, a series reactance corresponding to the gap 25 can then be added directly to transform the impedance to the characteristic impedance of the line 14. Thus, when the admittance $Y_{B^1}$ is the converse of the impedance $Z_{B^1}$, the desired reactance of the gap 25 can be read directly from the Smith Chart and the width of the gap 25 can be calculated from known curves as set forth, for instance, in an article by Arthur A. Oliner presented in the "IRE Transactions on Microwave Theory and Techniques"; March 1955. While the length of the stub 21*a* is always less than $\lambda(16\omega_0)/4$, the effect of the gap 25 will be to add the correct amount of end capacitance to make the stub effectively $\lambda(16\omega_0)/4$. Thus, the varactor 12 will be properly matched to the transmission line 14**.

To prevent power at the output signal frequency from travelling back down the transmission line 10 beyond reference point B, the open-circuited stub **21*b* having an electrical length $\lambda(16\omega_0)/4$ is connected at reference point C an odd number of quarter wave lengths from reference point B. In the present case, a spacing of $3\lambda(16\omega_0)/4$ was chosen in order to prevent interaction between the stubs 21*a* and 21*b*. Since the stub 21*b* is open-circuited, it reflects a short circuit at reference point C which is transformed to an open circuit at reference point B. Hence, the balance of the transmission line 10 including the stubs 22, 23 and 24 will not affect the match of the output circuit 13**.

The input 26 of the bandpass filter 15 is designed to have an input impedance of 50 ohms at the output frequency when the output of the filter 15 is terminated in a 50 ohm load. The transmission line 14 is designed to be $2\lambda(16\omega_0)$ so that the input impedance of 50 ohms to the filter 15 is reflected at the gap 25.

*Design of idler circuits*

In general, the output circuit (including traps) is designed first, followed by the highest idler circuit, the next highest idler circuit etc., with the input circuit being designed last. In the present embodiment, therefore, the first idler to be designed would be at a frequency 2 gHz. or $8\omega_0$.

By the method previously described, the admittance of the varactor 12 at the idler frequency $8\omega_0$ is calculated. In designing idler circuits the small series resistance of the varactor 12 can normally be ignored. While this resistance will affect the Q of the idler circuit, it does not normally have to be taken into account. Thus, the desired admittance reflected across the junction of varactor 12 by the transmission line 10 will be the conjugate of the varactor susceptance.

In FIGURE 4, the conjugate susceptance at a frequency $8\omega_0$ is plotted on the Smith Chart as $Y_{V^1}$. Again, as before, the varactor 12 is considered as the generator at the idler frequencies and the admittance $Y_{V^1}$ is transformed counter-clockwise around the Smith Chart a distance of $\lambda(8\omega_0)/16$ to reference point A where the desired admittance now is $Y_A$. As before, the admittance of the stubs 20 [having an electrical length equal to $\lambda(8\omega_0)/16$] is subtracted from the admittance $Y_{A^2}$ yielding an admittance $Y_{A^3}$. The admittance $Y_{A^3}$ is now transferred to point B by travelling the appropriate electrical length around the Smith Chart and has a value $Y_{B^2}$. This length is, of course, equal to half the electrical length at the output frequency $16\omega_0$.

The input 26 to the bandpass filter 15 reflects substantially an open circuit at the first idler frequency $8\omega_0$. This is reflected through the transmission line 14, which has an electrical length equal to $\lambda(8\omega_0)$ at the first idler frequency, to gap 25. Hence the gap 25 reflects substantially an open circuit at the first idle frequency at the end of the stub **21*a*. First this reason, only the actual electrical length of the stub 21*a* need be considered; this length being equal to half the electrical length at the output frequency $16\omega_0$. When the admittance of stub 21*a*** is subtracted from the admittance $Y_{B^2}$ the required admittance at that point becomes $Y_{B^3}$ on the Smith Chart.

The admittance $Y_{B^3}$ is then transformed to the reference point C which is located $3\lambda(8\omega_0)/8$ from reference point B. The admittance is now $Y_{C^2}$. When the admittance of the stub **21*b* at the frequency $8\omega_0$ is subtracted from the admittance $Y_{C^2}$ an admittance $Y_{C^3}$ is obtained. This admittance is now transformed by moving counterclockwise around the Smith Chart to a high admittance point $Y_D$, whereupon an open ended stub 22*a* having an electrical length $\lambda(\omega_0)/4$ is connected to the transmission line 10 at reference point D. It will be noted that in the present embodiment, to reach the reference point B it was necessary to pass by the stub 24*a*. However, this stub has been designed to reflect an open circuit on the transmission line 10** at $8\omega_0$ as hereinafter explained, and hence does not alter the position of the reference D.

By connecting a $\lambda(8\omega_0)/4$ stub to the transmission line 10 at the high admittance point D, the varactor is series resonated at the idler frequency $8\omega_0$. To prevent energy at $8\omega_0$ from travelling further down the transmission line towards the input tuning circuit 11, a second stub **22*b* having an electrical length $\lambda(8\omega_0)/4$ is connected at reference point E to the transmission line 10. This stub 22*b* together with the stub 22*a* and the adjourning transmission line form a parallel resonant circuit which reflect an open circuit on the transmission line 10** at the reference point D.

In a smaller manner, idler circuits are designed at 1 gHz. or $4\omega_0$, and 500 mHz. or $2\omega_0$. In the present embodiment, the stub **23*a* was placed at the second high conductance point in order to provide adequate spacing between the various stubs and prevent inter-action therebetween. In general, the idler tuning stubs were connected to the transmission line 10 so that the low frequency tuning stubs were further from the varactor 12 than the high frequency tuning stubs. In order to achieve this, line lengths of $\lambda/4$, $3\lambda/4$ and $5\lambda/4$, were used. An exception to this, was the design of the idler circuit at the frequency $2\omega_0$ utilizing stubs 24. In this particular case, the transmission line 10 would need to be excessively long if the stubs 24 were placed further away from the varactor 12 than the stubs 23. The $2\omega_0$ idler circuit was therefore made $\lambda/4$ long which caused the first high admittance point to fall between reference points C and D. The stub 24*a* was therefore placed at the point. However, to prevent interaction between the stub 24*a* and the transmission line at the frequencies $8\omega_0$ and $4\omega_0$ stubs 22*c* and 23*c* forming part of the stub 24*a*** were added.

The opening circuited stub **22*c* $\lambda(8\omega_0)/4$ long reflects a short circuit at the junction of the stub 24*a* which, in turn, reflects an open circuit at the transmission line 10**, reference point H, at the frequency $8\omega_0$. In the same manner, the open circuited stub 23*c*, $\lambda(4\omega_0)/4$ long, reflects a short circuit at the junction of the stub **24*a* which is transformed along the length of the stub 24*a* including that portion of the stub 22*c* to the reference point H where it too reflects substantially an open circuit. Howeven, the overall length of the stub 24*a* which includes the reflected admittances of the stubs 22*c* and 23*c*** reflects a short circuit at a reference point H at the frequency $2\omega_0$.

In the case of open circuited stub **24*b* which is connected to the transmission line 10 at reference point J, an electrical length $\lambda(2\omega_0)/4$ from the junction of the stub 24*a* this stub 24*b* does not appreciably affect the placement of the stubs 23, since the stub 24*b* is $\lambda(4\omega_0)/2$ at the frequency $4\omega_0$ thus reflecting substantially an open circuit on the transmission line 10** at reference point J.

*Design of input coupling circuit*

Figure 2:
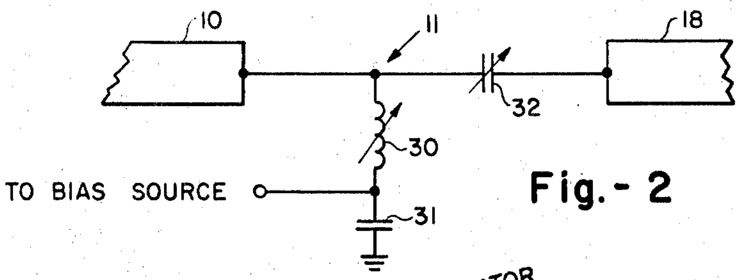
FIGURE 2 is a schematic diagram of lumped components forming part of the input coupling circuit of the multiplier illustrated in FIGURE 1.

In a similar manner as that described before, the input admittance of the varactor 12 at the input frequency $\omega_0$ is obtained. The conjugate of this admittance is then plotted on the Smith Chart and by transferring this admittance down the transmission line 10 taking into account the admittance of the tuning stubs 20 to 24, the desired admittance at the junction of transmission line 10 and the input coupling circuit 11 can be calculated. A matching network can then be designed to transform this admittance at any point on the line to the desired characteristic admittance or impedance which in the present case is 50 ohms. It was found in the present embodiment that at the junction of the transmission line 10 and the stub **23*b*, reference point G, the reflected admittance occurred at approximately a minimum conductance point having a mainly resistive impedance of about 1800 ohms. It was therefore necessary to transform this impedance of 1800 ohms to the characteristic impedance of the line of 50 ohms. FIGURE 2 illustrates a reactive matching network forming the input coupling circuit 11 and comprising an inductance 30 connected in shunt with the transmission line 10 through a D-C isolating capacitor 31, and, a capacitance 32 connected in series between the transmission line 10 and the transmission line 18**.

The inductance 30 is selected so that the combined impedance of it and the reflected conjugate impedance of the varactor 12 as transferred to point G have resistive component equal to the characteristic impedance of the transmission line 10 plus a reactive component. The reactive component of the parallel combination is then off-set by the series reactance of the capacitance 32 thereby providing a matched input at the input frequency $\omega_0$ of 50 ohms as seen from the connector 16.

The D-C isolating capacitor 31 was made large enough so that its reactance would not appreciably affect the tuning of the circuit. Since the capacitor 32 provides D-C isolation to the input connector 16 and since all the stubs 20 to 24 are open circuited, the varactor 12 can be readily biased by connecting a suitable bias source to the junction of the inductance 30 and the capacitor 31. In the present embodiment, the bias was adjusted so that the varactor 12 was reverse biased at about $Vb/3$ where $Vb$ is the reverse breakdown voltage of the varactor 12. Both the inductance 30 and the capacitance 31 were made turnable in order that optimum tuning and power transfer could be achieved.

*Additional design considerations*

In the above-described embodiment, all the stubs 20 to 24 with the exception of **21*a* are shown equal to a quarter of a wavelength at the desired frequency. In actual practice, stubs 22*a*, 23*a*, 24*a* were foreshortened slightly and gap 25 was made slightly wider than required. Two symmetrical tuning screws (not shown) were inserted through each ground plane (not shown) across the gap 25 and at the open end of each of the stubs 22*a*, 23*a* and 24*a***. The screws (not shown) can then be tuned to provide maximum output from the varactor multiplier. It is important that the two symmetrical screws should both be turned in or out by the same amount otherwise unbalances between the screw capacities to the two ground planes will develop. This may result in modes other than the TEM mode being propagated.

To tune the varactor multiplier, the output screws across the gap 25 would first be tuned to provide maximum power output. This is followed by tuning the screws at the end of stub **22*a*, then 23*a*, then 24*a*. It will be noted that since power in the transmission line 10 is prevented from travelling back towards the input coupling circuit 11 beyond the associated tuning stubs of each idler circuit, tuning of the higher order idlers first will not be affected by the later tuning of the lower order idlers. In the case of the tuning of stub 24*a*, this stub reflects substantially an open circuit at reference point H at $4\omega_0$ and $8\omega_0$ and hence will not affect the tuning of stubs 22*a* and 23*a***.

In designing the multiplier, care should be taken to allow for;

(1) the effective reference plane at the junction of the particular stub and the transmission line 10 to which the electrical length of the stub should be measured; and, (2) the capacitive end loading of each stub.

What is claimed is:

1. A frequency multiplier having at least one idler frequency comprising: a transmission line; input coupling means for coupling an input signal of a first frequency from a source to one end of said transmission line; output coupling means for coupling an output signal from said transmission line, said output signal being a harmonic of said input signal; a varactor connected across the other end of said transmission line; a first tuning stub connected to said transmission line between said output coupling means and said input coupling means so as to reflect parallel resonance at the junction of said output coupling means and said transmission line at the output signal frequency; a second tuning stub connected to said transmission line between said first tuning stub and said input coupling means so as to series resonate the varactor at said idler frequency; and a third tuning stub connected to said transmission line between said second tuning stub and said input coupling means so as to reflect parallel resonance at the junction of said second tuning stub and said transmission line at said idler frequency.

2. A frequency multiplier as defined in claim 1 which additionally comprises a fourth tuning stub connected to said transmission line between said output coupling means and said varactor so as to reflect parallel resonance at the junction of said varactor and said transmission line at the second harmonic of the output signal frequency.

3. A frequency multiplier as defined in claim 2 in which propagation along the transmission line and stubs is in the transverse electromagnetic mode.

4. A frequency multiplier as defined in claim 3 in which the transmission line and the stubs are constructed of stripline.

5. A frequency multiplier as defined in claim 2 in which the output coupling means comprises a further transmission line connected to said transmission line, said further transmission line having a discontinuity located a predetermined distance from the junction of said transmission line and said further transmission line, so as to match the varactor to the characteristic impedance of said further transmission line at the output signal frequency.

6. A frequency multiplier as defined in claim 5 which additionally comprises a band-pass filter, tuned to the output signal frequency and connected to said further transmission line a predetermined distance from said discontinuity so as to reflect an open circuit at said discontinuity at the idler frequency.

References Cited

UNITED STATES PATENTS

| | | | |
|---|---|---|---|
| 3,051,844 | 8/1962 | Beam et al. | 333—84 |
| 3,320,516 | 5/1967 | Lee | 321—69 |
| 3,328,670 | 6/1967 | Parker | 321—69 |
| 3,343,069 | 9/1967 | Tsuda | 321—69 |

OTHER REFERENCES

"Using Strip Transmission Line to Design Microwave Circuits, Part I, by Dangel & Steele; Electronics, Feb. 7, 1966; pages 72–83 relied upon.

JOHN F. COUCH, *Primary Examiner.*

G. GOLDBERG, *Assistant Examiner.*